(12) United States Patent
Yang et al.

(10) Patent No.: US 7,654,539 B2
(45) Date of Patent: Feb. 2, 2010

(54) LOCKING DRILL CHUCK

(75) Inventors: Guimo Yang, Wendeng (CN); Yanzhao Li, Wendeng (CN)

(73) Assignee: Shandong Weida Machinery Co., Ltd., Wendeng (CN)

( * ) Notice: Subject to any disclaimer, the term of this patent is extended or adjusted under 35 U.S.C. 154(b) by 253 days.

(21) Appl. No.: 11/360,152

(22) Filed: Feb. 23, 2006

(65) Prior Publication Data

US 2007/0013150 A1    Jan. 18, 2007

(30) Foreign Application Priority Data

Jul. 14, 2005    (CN) .................. 2005 1 0083095

(51) Int. Cl.
*B23B 31/12*    (2006.01)
(52) U.S. Cl. .................. 279/62; 279/125; 279/140; 279/902
(58) Field of Classification Search .................. 279/60, 279/61, 62, 125, 140, 902
See application file for complete search history.

(56) References Cited

U.S. PATENT DOCUMENTS

| | | | | |
|---|---|---|---|---|
| 271,941 | A | * | 2/1883 | Sleeth et al. .................. 279/71 |
| 435,475 | A | * | 9/1890 | Abrams ....................... 279/114 |
| 1,442,107 | A | * | 1/1923 | Vernaz ........................ 279/114 |
| 2,690,915 | A | * | 10/1954 | Pealer ......................... 279/114 |
| 2,910,302 | A | * | 10/1959 | Ondeck ......................... 279/22 |
| 4,469,362 | A | * | 9/1984 | Schaarschmidt et al. ..... 294/116 |
| 4,762,357 | A | * | 8/1988 | Bergamo .................. 294/119.1 |
| 5,145,194 | A | * | 9/1992 | Huff et al. ...................... 279/62 |
| 5,158,487 | A | * | 10/1992 | Varnau ........................ 29/33 P |
| 5,215,317 | A | * | 6/1993 | Jordan et al. .................. 279/63 |
| 5,411,275 | A | * | 5/1995 | Huff et al. ...................... 279/62 |
| 5,503,409 | A | * | 4/1996 | Rohm .......................... 279/62 |
| 5,531,461 | A | * | 7/1996 | Huff et al. ...................... 279/62 |
| 5,615,899 | A | * | 4/1997 | Sakamaki ..................... 279/62 |

(Continued)

FOREIGN PATENT DOCUMENTS

EP    340310    A1 *    11/1989

(Continued)

*Primary Examiner*—Eric A Gates
(74) *Attorney, Agent, or Firm*—Workman Nydegger

(57) ABSTRACT

A locking drill chuck comprises a chuck body, a plurality of jaws, a nut, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises a locking sleeve provided between the front sleeve and the rear sleeve, and connected with the front sleeve; and a locking assembly provided between the nut and a stop surface of the chuck body, the locking assembly includes rolling members and a locking plate, wherein the locking plate connects with the locking sleeve, and has a plurality of eccentric grooves in an end plane thereof, the rolling members is received in the eccentric grooves, the stop surface of the chuck body includes a conical portion and a plane portion. The locking drill chuck in accordance with the present invention is convenient for machining process, with lower product cost, and is more steady and reliable in operating.

19 Claims, 12 Drawing Sheets

U.S. PATENT DOCUMENTS

| | | | |
|---|---|---|---|
| 5,669,616 A * | 9/1997 | Ho | 279/62 |
| 5,984,320 A * | 11/1999 | Nakamura | 279/62 |
| 6,220,608 B1 * | 4/2001 | Varnau | 279/114 |
| 6,474,657 B1 * | 11/2002 | Fan-Chiang et al. | 279/62 |
| 6,991,238 B2 * | 1/2006 | Yang et al. | 279/62 |
| 7,125,021 B2 * | 10/2006 | Tan | 279/62 |
| 2002/0149159 A1 * | 10/2002 | Fan-Chiang et al. | 279/62 |
| 2005/0023775 A1 * | 2/2005 | Yang et al. | 279/62 |
| 2005/0212223 A1 * | 9/2005 | Tian et al. | 279/62 |

FOREIGN PATENT DOCUMENTS

| | | |
|---|---|---|
| EP | 1498202 A1 * | 1/2005 |

\* cited by examiner

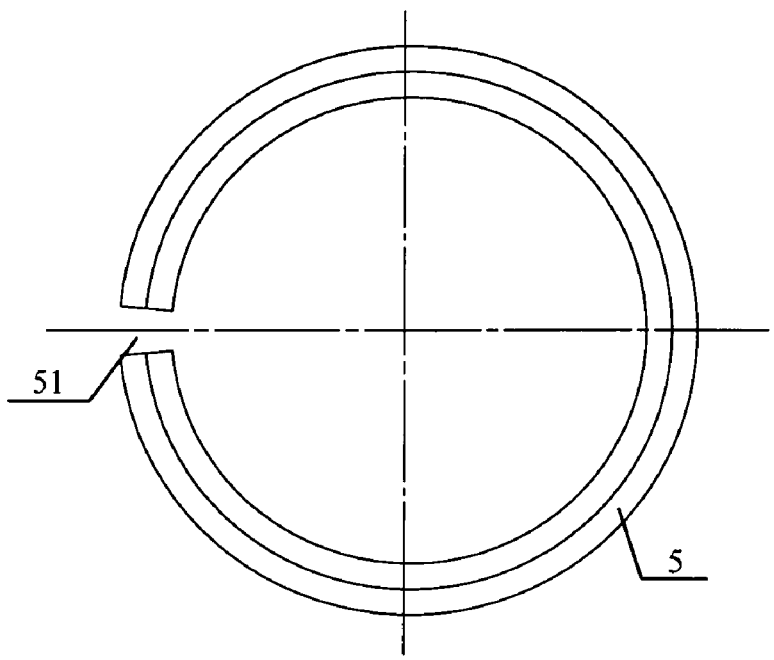
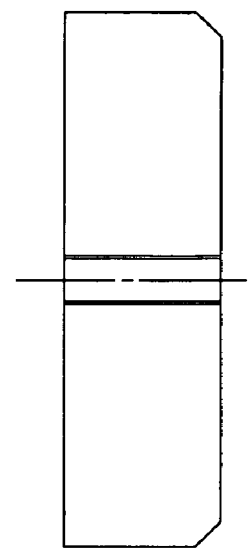
Fig. 10A                                            Fig. 10B
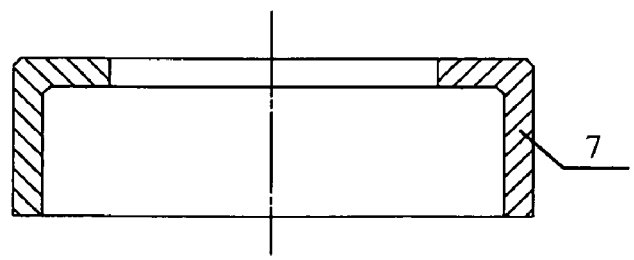
Fig. 11

LOCKING DRILL CHUCK

This application claims the benefit of the Chinese patent application No. 200510083095.9 filed on Jul. 14, 2005, which is hereby incorporated by reference.

TECHNICAL FIELD

The present invention relates to a drill chuck device, in particular, a locking drill chuck.

BACKGROUND ART

A conventional drill chuck comprises a chuck body, a plurality of (for example, three) jaws, a nut, an exterior sleeve comprising a front sleeve and a rear sleeve, etc., and further comprises a bearing and a bearing washer in the case of manual locking drill chuck for reducing friction. The rear sleeve and the bearing spacer are close fitted to the chuck body, respectively. The three jaws are separately mounted in three corresponding inclined holes equally parted from each other in the chuck body. The nut is deposited in a nut slot of the chuck body, and forms a screw drive mechanism associated with the screw thread of the jaws. The nut also has a nut jacket around and closely fitted therewith. Around the nut jacket is the front sleeve that has keys in its inner wall and in the nut jacket there are recesses corresponding to the keys, such that the front sleeve can be interconnected with the nut jacket via the keys. For preventing the front sleeve from axial shifting, a buffer is close fitted in the front end of the chuck body.

In the use, one may manually rotate the front sleeve, in turn the front sleeve drives the nut jacket and the nut, and then the nut drives the jaws move forward and backward in the inclined holes of the chuck body, so that the three jaws are splayed or closed for completing the loosening and clamping of a drill tool.

However, there are some disadvantages in the prior art that the drill chuck tends to be loosening due to vibration and impact during operation, these results in that the work efficiency is badly influenced and the safety property is poor. With the broadly increasing application of the drill chuck, the request to the product in its working reliability becomes higher and higher. However, the prior art drill chuck is distinctly insufficient in performance of clamping and loosening.

Chinese patent application for invention No. 03138814.0 filed by the present inventor on Jul. 15, 2003 disclosed a locking drill chuck comprising a chuck body, a plurality of jaws, a nut, a nut jacket, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises: a locking sleeve provided between the front sleeve and the rear sleeve, and connected with the front sleeve; and a locking assembly provided between the nut and a stop surface of the chuck body, the locking assembly consisting of a locking cap, rolling members, and a locking plate, wherein the locking plate has a plurality of helical grooves with helix angle in an end plane thereof, the rolling members is received in the helical grooves, the locking cap has resilient tabs securing the locking plate together with the plurality of rolling members, and the locking sleeve securely connected to the locking plate.

The locking drill chuck according to said invention provides a secondary locking function through imputing torque and locking by an interlocking mechanism in addition to the first screw locking function between the nut and jaws, being reasonable in structures, easy for assembly, steady in performance, and labor saving, reliable in operating. However, such a locking drill chuck requires to machine helical grooves with helix angle, therefore, it is inconvenient for machining process, and the cost of product is high.

SUMMARY OF THE INVENTION

An objective of the present invention is to provide a locking drill chuck that is convenient for machining process, with lower product cost, and is more steady and reliable in operating.

The locking drill chuck in accordance with the present invention comprises a chuck body, a plurality of jaws, a nut, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises a locking sleeve provided between the front sleeve and the rear sleeve, and connected with the front sleeve; and a locking assembly provided between the nut and a stop surface of the chuck body, the locking assembly includes rolling members and a locking plate, wherein the locking plate connects with the locking sleeve, and has a plurality of eccentric grooves in an end plane thereof, the rolling members is received in the eccentric grooves, the stop surface of the chuck body includes a conical portion and a plane portion.

The locking assembly further includes a locking cap deposited between the rolling members and the stop surface of the chuck body, the rolling members contact and press against the stop surface of the chuck body through the locking cap, and the locking cap has resilient tabs securing the locking plate together with the plurality of rolling members.

The groove is arc groove. The locking sleeve has connecting tenons on its inner circumference, and the locking plate has recesses in a lower portion of its outer circumference, the tenons and the recesses are fitted together.

The locking sleeve has a plurality of tenons on a central portion of its outer circumference, and the front sleeve has a plurality of recesses with a width larger than that of the tenons for receiving the tenons.

The locking drill chuck further comprises a resilient interlock, which is shaped in an opening ring with a plurality of projections, the locking sleeve has a plurality of interlocking notches below the tenons, and the front sleeve has a plurality of axial interlocking slots for receiving the corresponding projections of the resilient interlock passed through the interlocking notches of the locking sleeve, so that the locking sleeve is positioned and guided in the front sleeve.

The locking drill chuck further comprises a driving sleeve deposited between the front sleeve and the nut, wherein the driving sleeve has a plurality of resilient pawls around its outer circumference and a plurality of driving key at its upper end, the front sleeve has a plurality of fitted slot in its inner circumference for receiving the resilient pawls, and the nut has a plurality of recesses at its lower end, so that the front sleeve drives the driving sleeve and thereby the nut transmits torque.

The locking plate has a plurality of locking flumes in the lower portion of its outer circumference, and the locking cap has a plurality of resilient tabs correspondingly, the resilient tabs may fit in and move along the locking flumes.

The locking drill chuck further comprises a baffle ring rotatably mounted between the lower ends of the front sleeve and the chuck body to prevent the sleeve from axial shifting with respect to the chuck body.

The baffle ring has an circumferential opening, and has a skirt close fitted thereto, thereby the baffle ring can fit in an annular groove formed in a lower portion of the chuck body, and resist against a rabbet at the lower end of the front sleeve.

According to another aspect of the present invention, A further locking drill chuck is provided and that comprises a chuck body, a plurality of jaws, a nut, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises: a locking sleeve provided between the front sleeve and the rear sleeve, and connected with the front sleeve; and a locking assembly provided between the nut and a stop surface of the chuck body, the locking assembly includes: a locking plate, connecting with the locking sleeve and having a plurality of eccentric grooves in an end plane thereof; rolling members received in the eccentric grooves; and a locking cap deposited between the rolling members and the stop surface of the chuck body, and having resilient tabs securing the locking plate together with the plurality of rolling members.

According to another aspect of the present invention, A further locking drill chuck is provided and that a chuck body, a plurality of jaws, a nut, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises: a locking sleeve provided between the front sleeve and the rear sleeve, and connected with the front sleeve; and a locking assembly provided between the nut and a stop surface of the chuck body, the locking assembly includes: a locking plate, connecting with the locking sleeve and having a plurality of grooves in an end plane thereof; rolling members received in the eccentric grooves; and a locking cap deposited between the rolling members and the stop surface of the chuck body, including a conical portion and a plane portion at the undersurface thereof, and having resilient tabs securing the locking plate together with the plurality of rolling members.

Wherein the grooves in the end plane of the locking plate is eccentric grooves.

Thanks to the above-mentioned structures, the drill chuck according to the present invention still possesses a secondary locking function and by adopting the eccentric grooves, the locking drill chuck is convenient for machining process, with lower product cost, and is more steady and reliable in operating.

BRIEF DESCRIPTION OF THE DRAWINGS

The above and other objectives and features of the present invention will become apparent from the following description of preferred embodiments, given in conjunction with the accompanying drawings, in which:

FIG. 4 is a schematic view of a locking plate of the locking drill chuck according to present invention, wherein

FIG. 5 is a schematic view of a locking sleeve of the locking drill chuck according to the present invention, wherein

FIG. 6 is a schematic view of a locking cap of the locking drill chuck according to the present invention, wherein

FIG. 7 is a schematic view of structures of a driving sleeve of the locking drill chuck according to the present invention, wherein

FIG. 8 is a schematic view of a front sleeve of the locking drill chuck according to the present invention, wherein

FIG. 9 is a schematic view of a resilient interlock of the locking drill chuck according to the present invention, wherein

FIG. 10 is a schematic view of a baffle ring of the locking drill chuck according to the present invention, wherein FIG. 10A is a plane view of the baffle ring, and FIG. 10B is a left view of the baffle ring; and FIG. 11 is a cross-sectional view of a skirt of the locking drill chuck according to the present invention.

DESCRIPTION OF PREFERRED EMBODIMENTS

Figure 1:
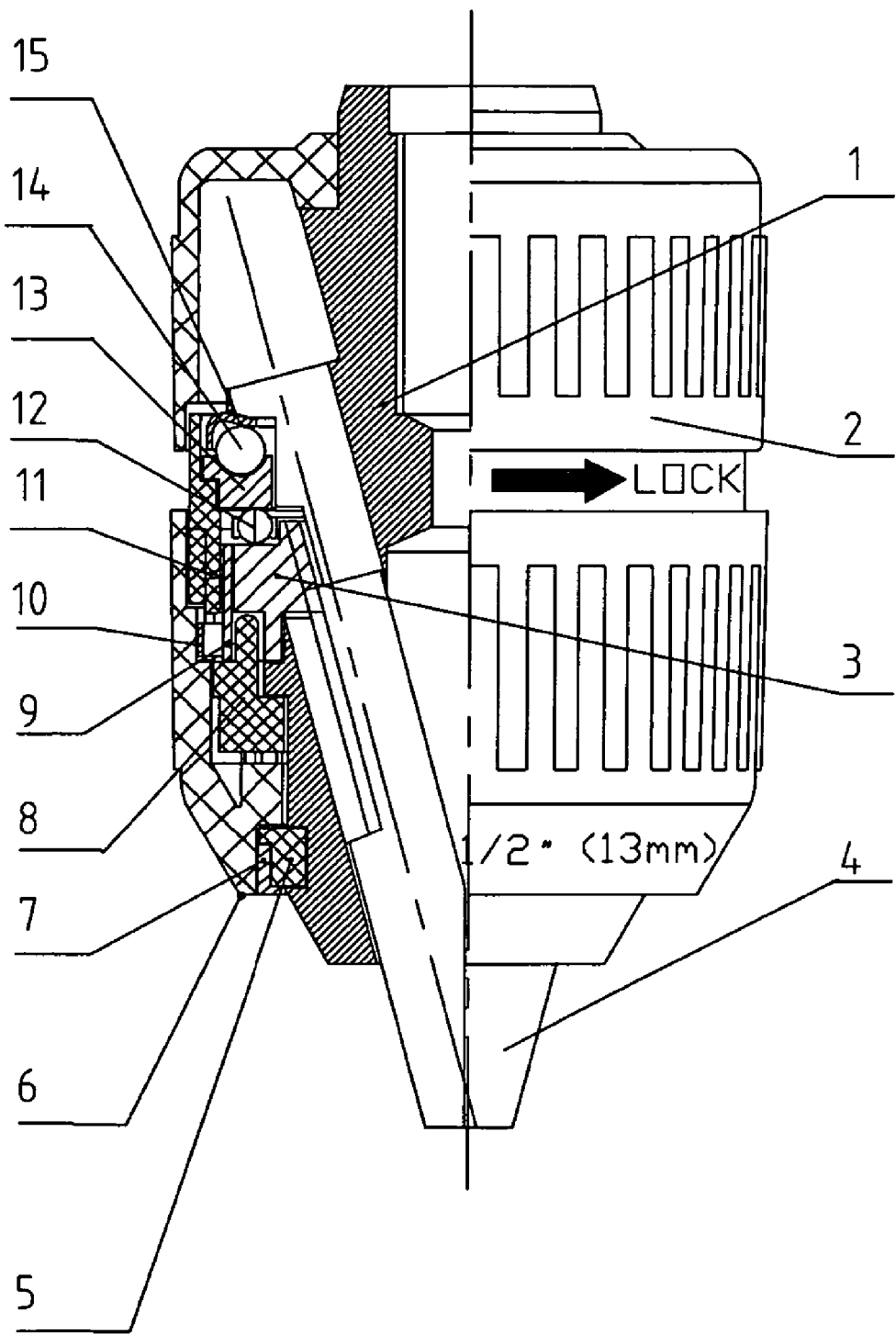
FIG. 1 is a schematic view, partly in cross-section, of a locking drill chuck in accordance with an embodiment of the present invention.
Figure 2:
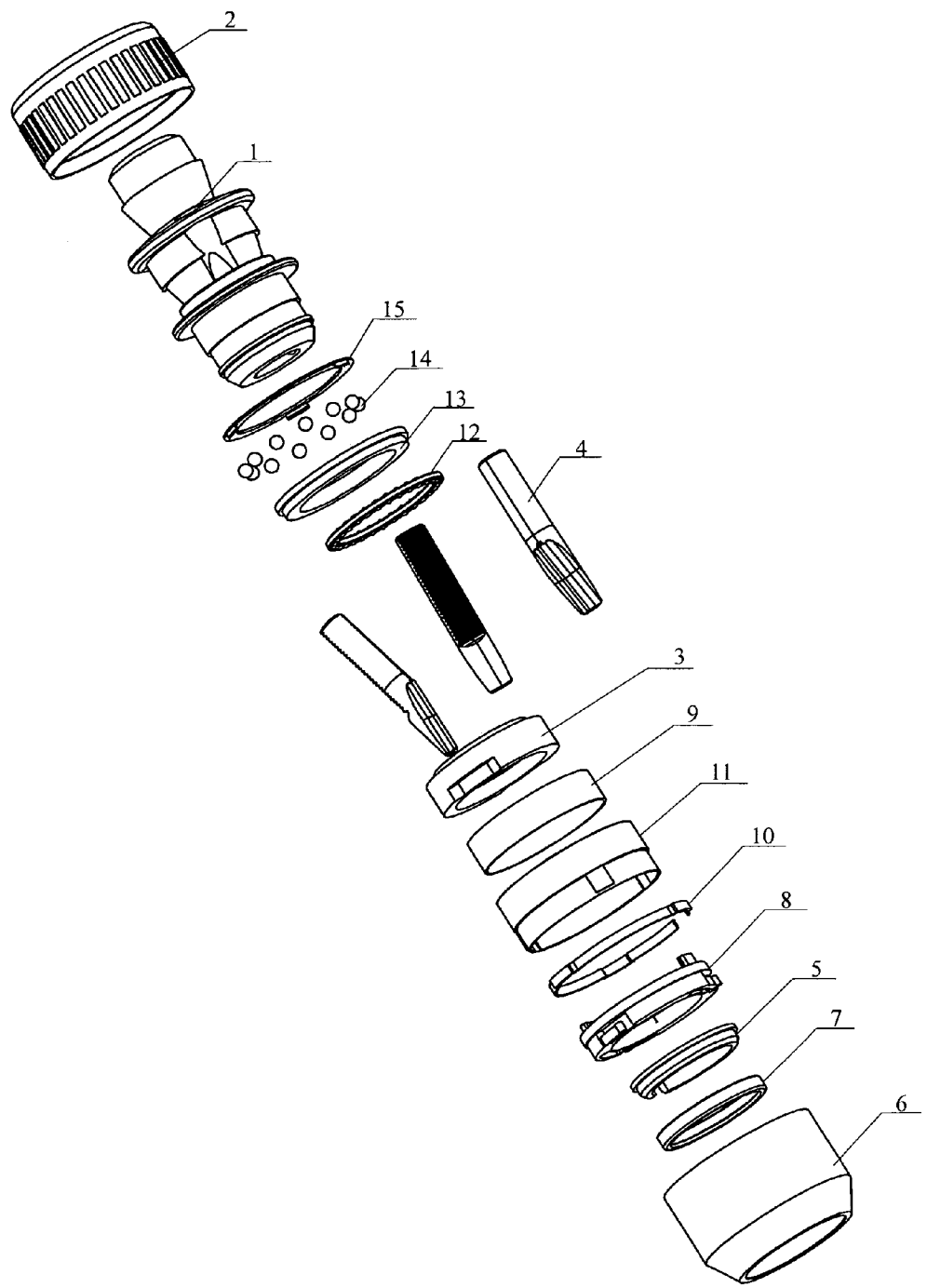
FIG. 2 is a perspective exploded schematic view of the locking drill chuck in FIG. 1.

As shown in FIG. 1 and FIG. 2, the locking drill chuck according to a first embodiment of the present invention comprises a chuck body 1, a plurality of (for example, three) jaws 4, a nut 3, a front sleeve 6, a rear sleeve 2, and a bearing 12. The chuck body 1 has an axial hole at its rear end for engaging with a driving shaft of a driving means, and the rear sleeve 2 close fits with the outer circumference of the rear end of chuck body 1. The three jaws 4 are separately mounted in three corresponding inclined holes equally departed away from each other in the chuck body 1. The nut 3 engages with the jaws 4 in the inclined holes of the chuck body and the outer circumference of the nut 3 is connected and secured to the front sleeve 6. There is a nut jacket 9 between the front sleeve 6 and the nut 3. The preceding components, structures and connecting relationship are all prior art and the detailed description will be omitted.

Figure 3:
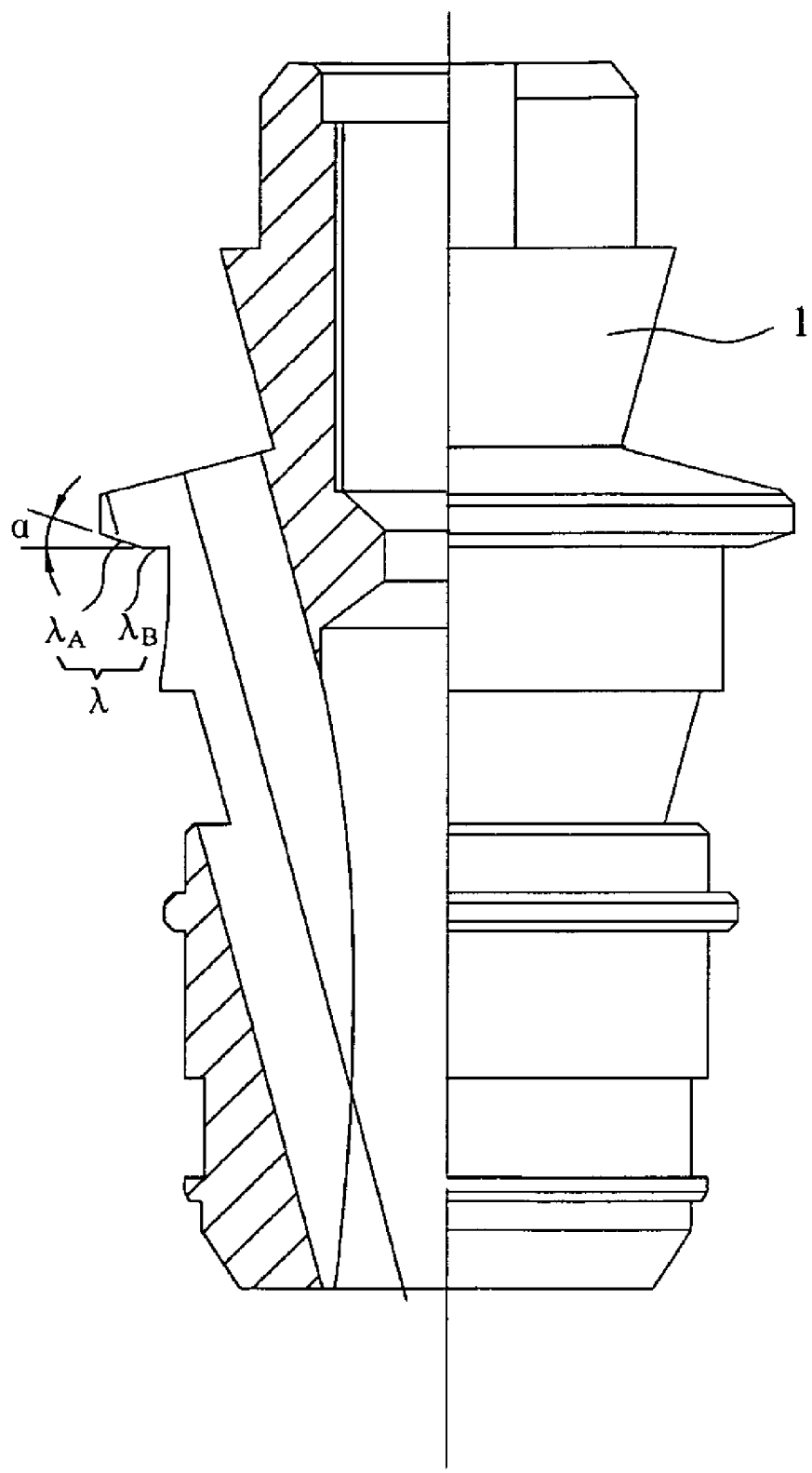
FIG. 3 is a sectional structural schematic view of the chuck body in FIG. 1.
Figure 4A:
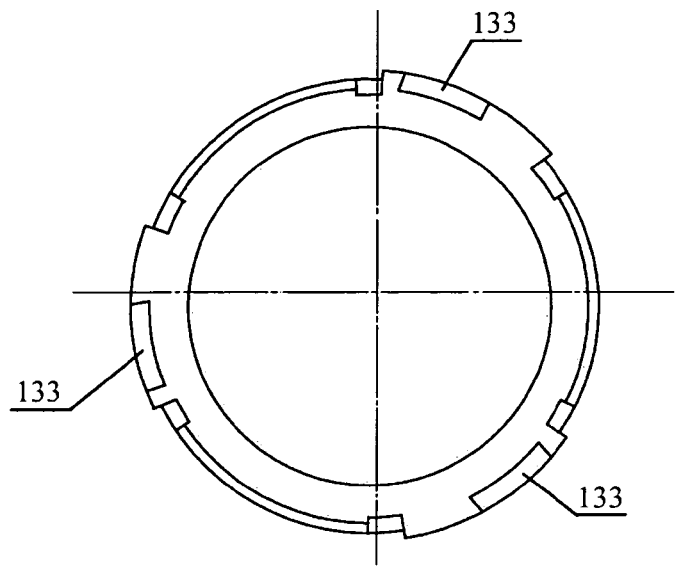
FIG. 4A is a bottom view of the locking plate.
Figure 4B:
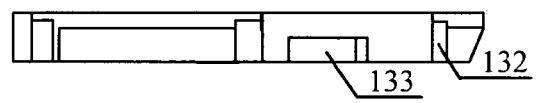
FIG. 4B is a front view of the locking plate.
Figure 4C:
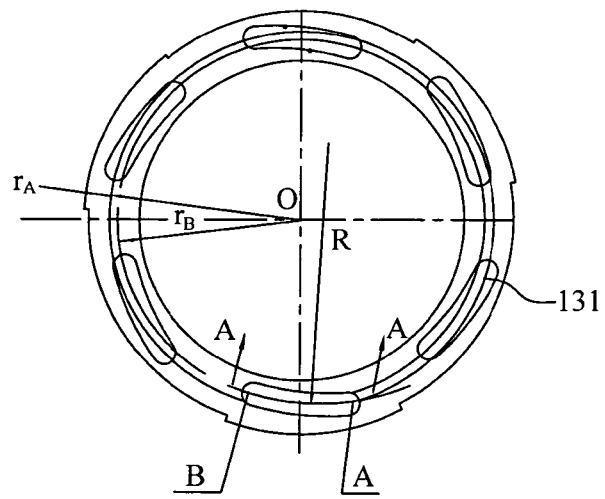
FIG. 4C is a top view of the locking plate.
Figure 4D:
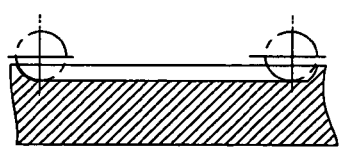
FIG. 4D is an enlarged cross-sectional view of the locking plate taken along line A-A of FIG. 4C.

As shown in FIG. 3, the chuck body 1 has a stop surface λ including a conical portion $\lambda_A$ located outside and a plane portion $\lambda_B$ located inside. Wherein the tapered angle of the conical portion $\lambda_A$ with respect to the horizontal surface is α.

There is a locking sleeve 11 provided between the front sleeve 6 and the rear sleeve 2 around the chuck body 1, and an elastic locking assembly comprising a locking cap 15, a plurality of rolling bodies, such as steel ball 14, and a locking plate 13 between the stop surface of chuck body 1 and the nut 3.

As shown in FIGS. 4A, 4B, 4C, and 4D, in upper end plane of the locking plate 13 there are a plurality of uniformly distributed eccentric grooves 131, the grooves may be contour (in the same level for their corresponding points). There is a rolling body provided in each of the grooves 131, such as a steel ball 14. Each of the grooves 131 corresponds to the stop surface of the chuck body 1, such that the rolling bodies may press against the conical portion $\lambda_A$ and the plane portion $\lambda_B$. Each of the grooves 131 in the end plane of the locking plate is shaped an arc distributed along a radius R, and has an outside position A in the radius $r_A$ and an inside position B in the radius $r_B$. The grooves 131 including the position A and B are eccentrically formed relative to the center O of the locking plate 13, and meanwhile, the height of the grooves, i.e. the level of the groove bottom, is equal. Such that, when the locking plate moves to make the rolling body rolling within the grooves 131, the rolling bodies move eccentrically relative to the center O of the locking plate 13 with the constant level for the rolling bodies. For the grooves 131, it may be regarded as a plurality of groove sections axially duplicated in a same level plane by one groove element. Alternatively, the curved surface may also be duplicated in other end planes being pressed shown in FIG. 1, i.e., the pressed end plane of the locking cap, the chuck body or the nut, accordingly, the conical portion $\lambda_A$ and the plane portion $\lambda_B$ located in the stop surface of the chuck body may also provides in other suitable end surface.

The locking plate 13 has a plurality of locking flumes 132 at a lower portion of its outer circumference for connecting with the locking cap 15, and the locking plate 13 has a plurality of recesses 133 for connecting with the locking sleeve 11, such that an elastic locking assembly is formed. The locking sleeve 11 in accordance with the present invention may be a separate middle sleeve or may be connected with the front sleeve 6 to become an attached sleeve interlocked.

Figure 6A:
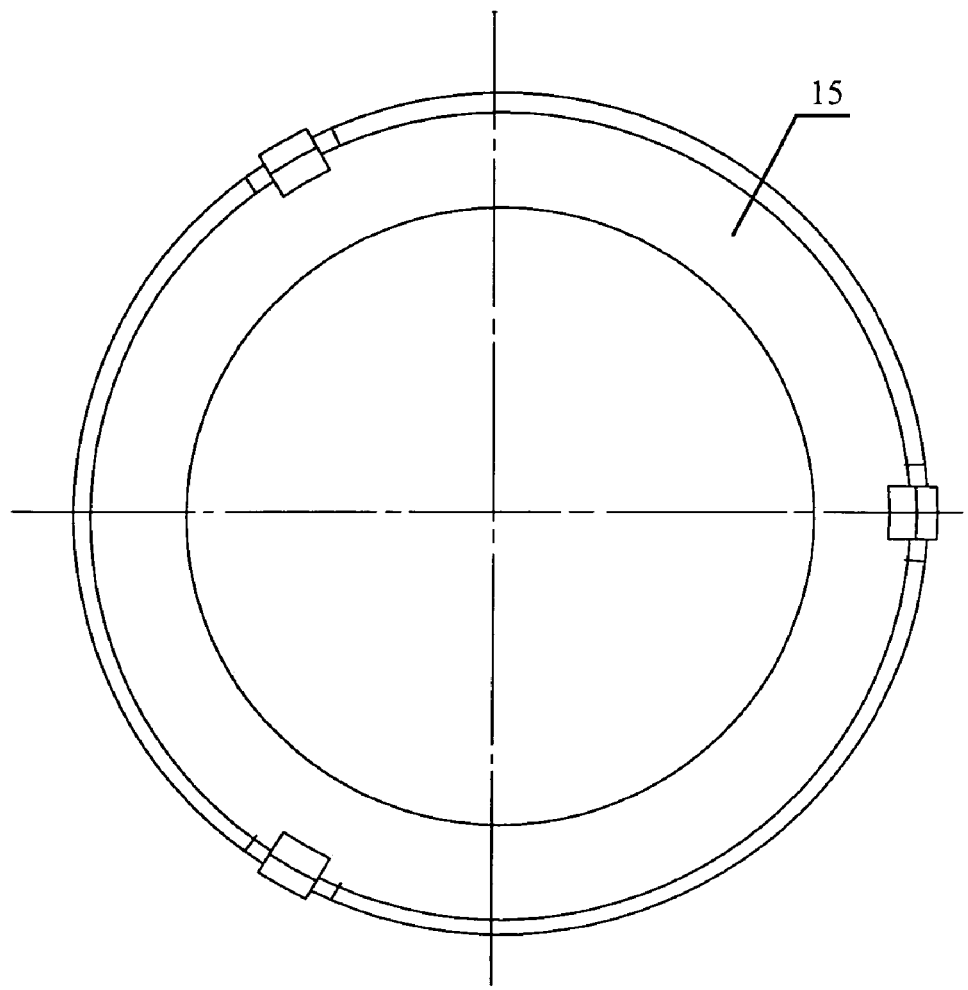
FIG. 6A is a bottom view of the locking cap.
Figure 6B:
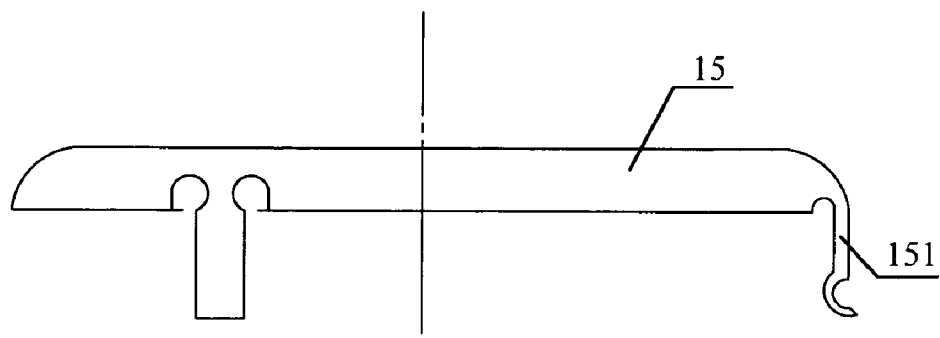
FIG. 6B is a front view of the locking cap.

As shown in FIGS. 6A and 6B, the locking cap 15 has a plurality of resilient tabs 151 which may move along and be positioned in the locking flume 132 at the lower end of the outer circumference of the locking plate 13. The steel balls 14 are placed in the helical grooves 131 in the end plane of the locking plate 13. The locking plate 13 and the steel balls 14 are interlocked together by the resilient tabs 151 of the locking cap 15.

Referring to FIGS. 1-3, the locking cap resists against the stop surface λ of the chuck body 1, the stop surface λ being corresponding to the eccentric grooves 131 in the locking plate, and the conical portion $\lambda_A$ located outside of the stop surface and the plane portion $\lambda_B$ located inside of the stop surface being corresponding to the outside position A and the inside position B of the eccentric grooves 131, respectively. Under the pressure of the steel balls, the locking cap 15 may deform so that the shape thereof coincide with the conical portion $\lambda_A$ and the plane portion $\lambda_B$ in the stop surface λ of the chuck body 1, that is, has locking cap conical portion and a locking cap plane portion.

Figure 5A:
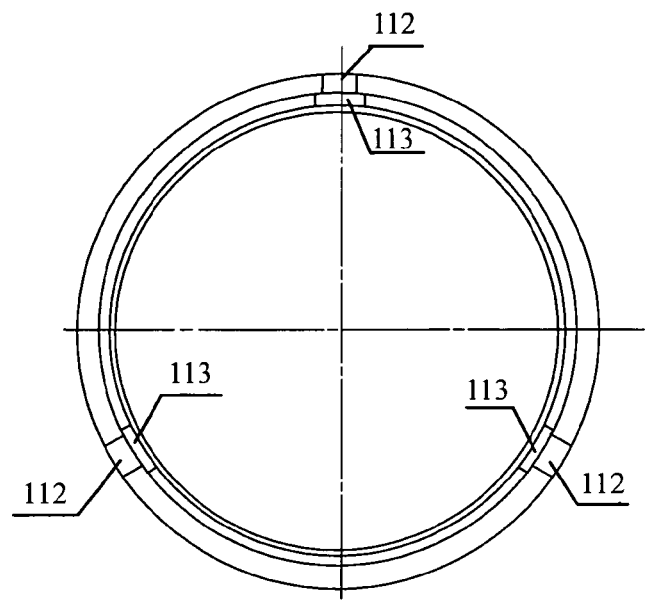
FIG. 5A is a bottom view of the locking sleeve.
Figure 5B:
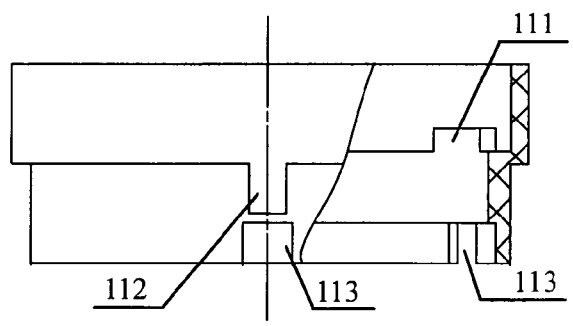
FIG. 5B is a front view of the locking sleeve.
Figure 5C:
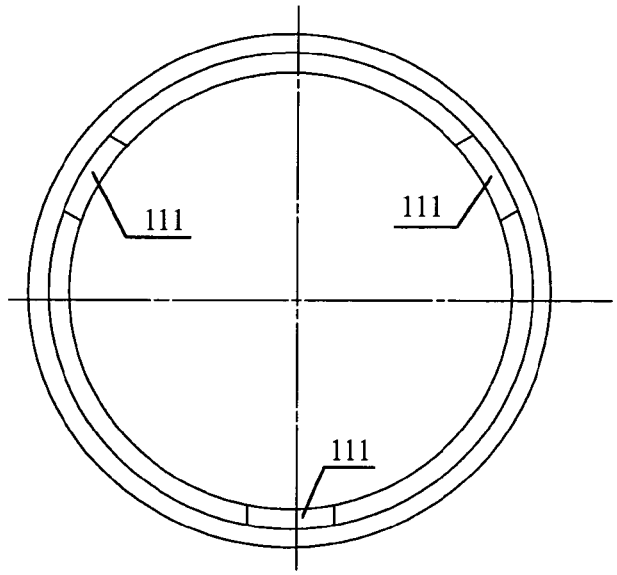
FIG. 5C is a top view of the locking sleeve.

The locking sleeve 11 is connected to the recesses of the locking plate 13. FIG. 5 is a schematic view of structures of a locking sleeve 11. As shown in FIGS. 5A, 5B, and 5C, the locking sleeve 11 has tenons 111 for connecting to the corresponding recesses 133 at a lower portion of the outer circumference of the locking plate 13. The locking sleeve 11 and the locking plate 13 are connected together through tenons 111 and recesses 133.

Figure 8A:
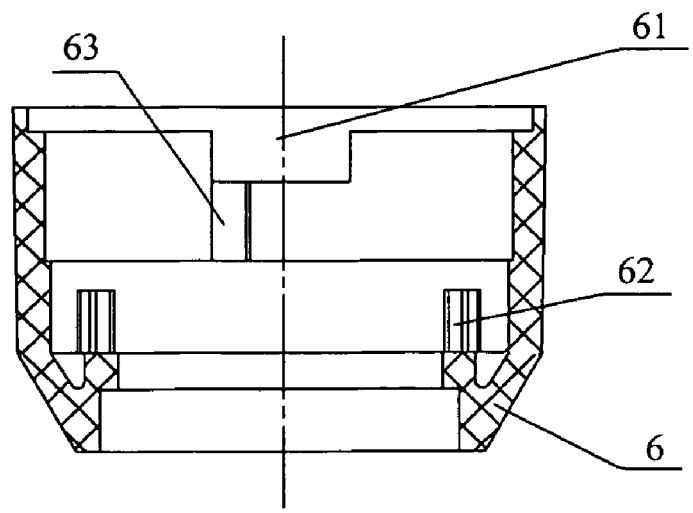
FIG. 8A is a cross sectional view of the front sleeve.
Figure 8B:
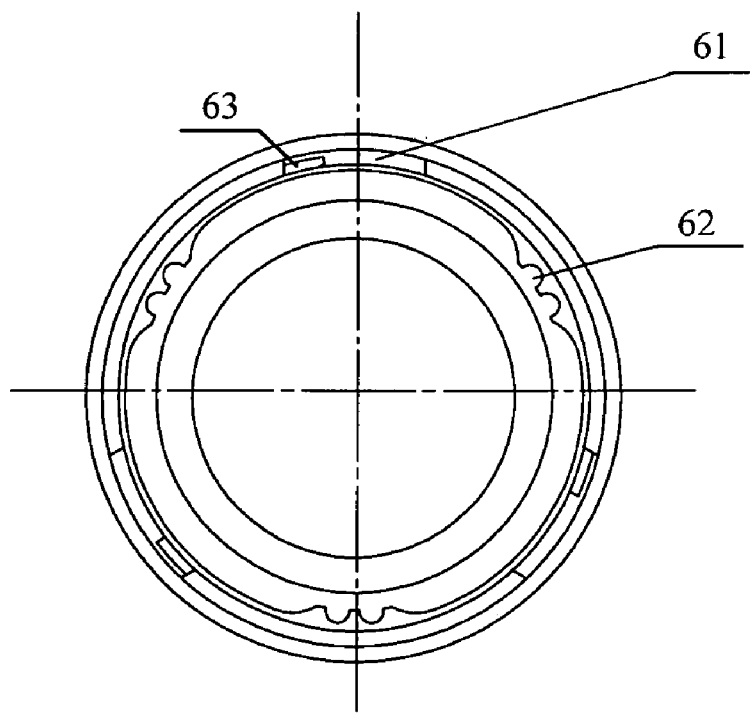
FIG. 8B is a top view of the front sleeve.
Figure 9A:
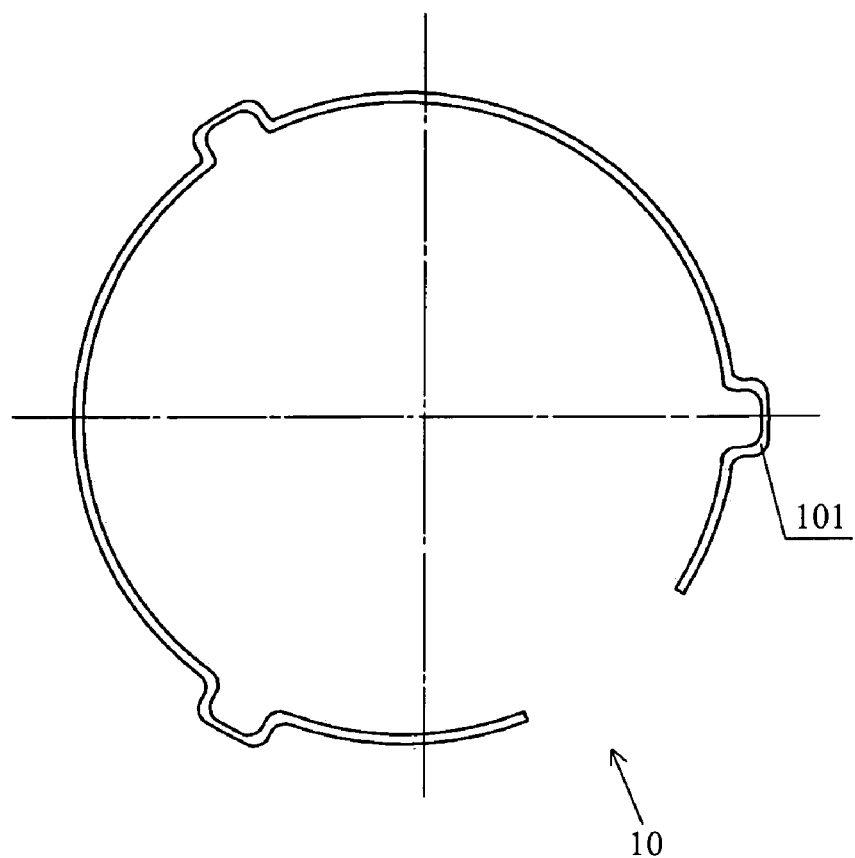
FIG. 9A is a bottom view of the resilient interlock.
Figure 9B:
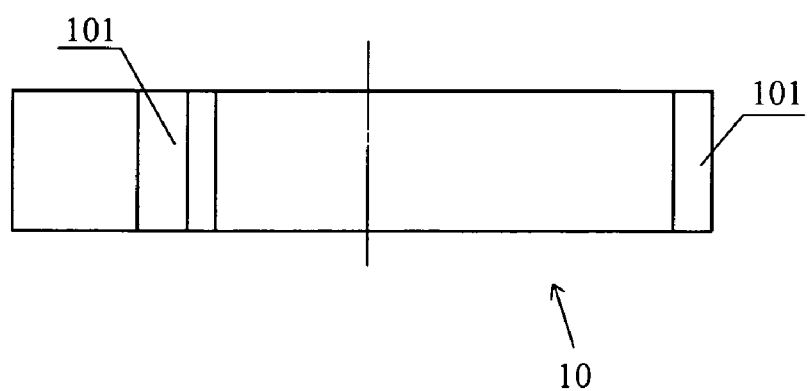
FIG. 9B is a front view of the resilient interlock.

The locking sleeve 11 also has a plurality of tenons 112 at the middle part of its outer circumference and has opening interlocking notches 113 below the tenons 112. A resilient interlock 10 is provided in the locking sleeve 11. The resilient interlock 10 an opening and a plurality of projection 101 that correspond to and pass through the interlocking notches 113 of the locking sleeve 11. And meanwhile, as shown in FIGS. 8A and 8B, the front sleeve 6 has a plurality of circumferential recesses 61 in its inner circumference with a width larger than that of the tenons 112 of the locking sleeve 11 for receiving the tenons 112, thus there is a big gap provided between the laterals of the tenons 112 and the recesses 61. The front sleeve 6 also has a plurality of axial interlocking slots 63 for receiving the corresponding projections 101 of the resilient interlock 10 passed through the interlocking notches 113 of the locking sleeve 11.

Thus, the locking sleeve 11 is positioned and guided in the front sleeve 6 by the interlocking notches 113, the interlocking slots 63, and the projection 101 fitted together, and one side of each tenon 112 of the locking sleeve 11 abuts one side of the each recess 61 of the front sleeve 6, thereby a synchronous movement and detachment of the front sleeve 6 and the locking sleeve 11 are achieved.

Figure 7A:
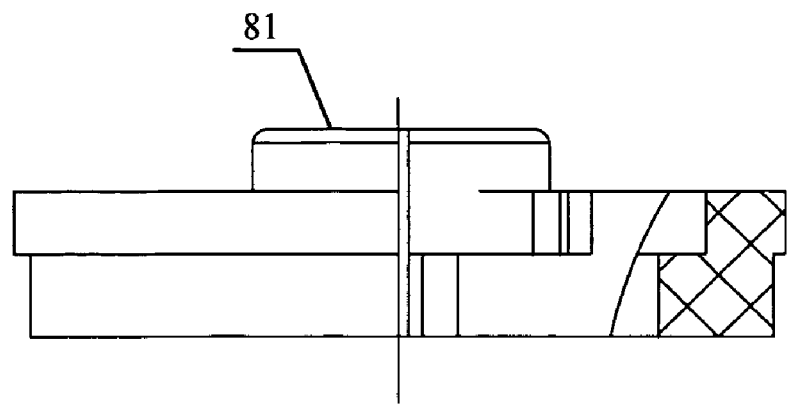
FIG. 7A is a front view, partly in cross-section, of the driving sleeve.
Figure 7B:
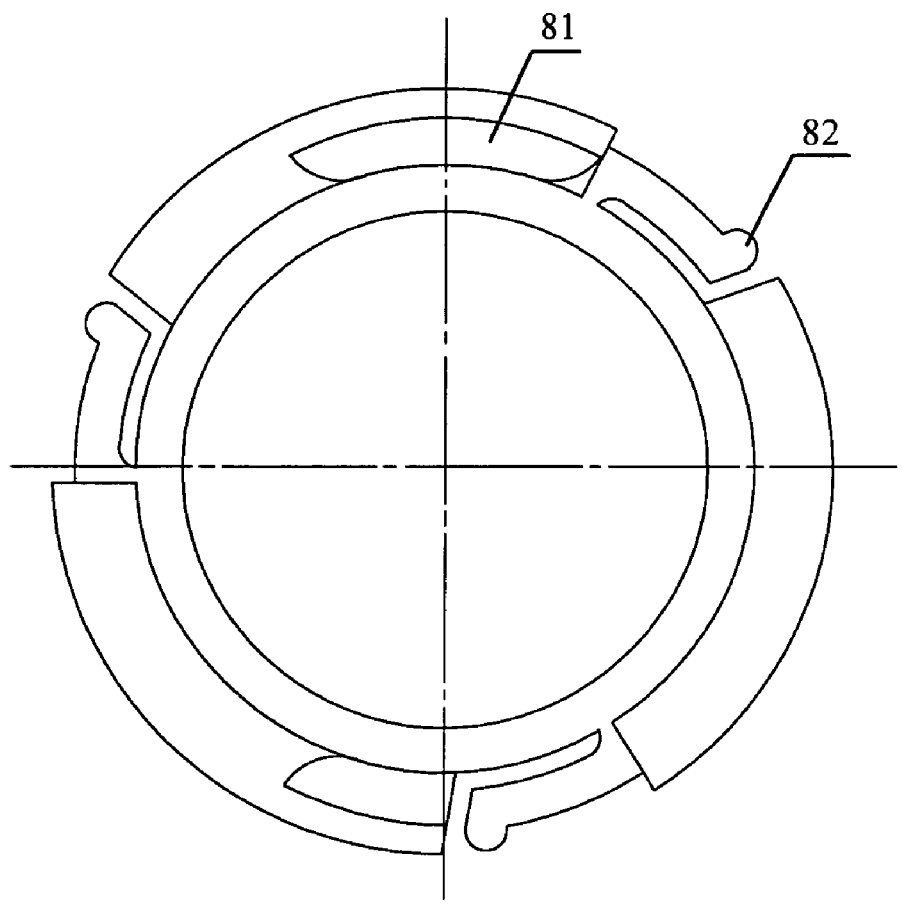
FIG. 7B is a top view of the driving sleeve.

A driving sleeve 8 is further deposited between the front sleeve 6 and the nut 3, the nut jacket 9 in accordance with the present invention. As shown in FIG. 7, the driving sleeve 8 has a plurality of driving keys 81 inserted into a plurality of recesses (not shown) at a lower part of the nut 3 with a small gap, and the three resilient pawls 82 in the outer circumference of the driving sleeve 8 fits with the fitted slots 62 of the front sleeve 6 for transmitting the torque to the nut 3, thereby the nut 3 can drive the jaws 4 to clamp firmly. When the imputed torque reaches a value range predetermined, the three resilient pawls 82 disengage from the fitted slots 62 of the front sleeve 6 automatically, and the nut 3 will not rotate any more. Thereafter, the transmitting path of the torque is changed so that the front sleeve 6 accomplishes the force imputes through the locking sleeve 11.

As to the positioning of the front sleeve 6, as shown in FIGS. 1-3 and 10-11, there is a baffle ring 5 rotatably mounted in an annular groove formed in a front portion of the chuck body 1. The baffle ring 5 resists against a rabbet at the lower end of the front sleeve 6 and has a skirt 7 close fitted thereto. The baffle ring 5 has a circumferential opening, so that the front sleeve 6 may rotate freely relative to the chuck body 1 and meanwhile prevent itself from being shifted axially.

Next, the operation of the present invention will be described as following.

As shown in FIG. 1, when an exterior force is applied to the front sleeve 6, the front sleeve 6 rotates and drives the driving sleeve 8 and further the nut 3, and in turn makes the jaws 4 to move forward. Thereby the front ends of the jaws 4 approach the drill tool to be clamped, and meanwhile the resilient interlock 10 is driven by the front sleeve 6 and rotates synchronistically with the locking assembly. When the front ends of the jaws move against an outer surface of the drill tool to be clamped, the torque imputed increases so that the drill tool is clamped.

At the same time, the resilient interlock 10 disengages from the interlocking slot 63 of the front sleeve 6, and locking cap 15 ceases rotating owing to the increasing friction between the locking cap 15 and a stop surface of the chuck body 1. If the imputed torque reaches a certain range of value, the three resilient pawls 82 of the driving sleeve 8 will disengage from the fitted slot 62 of the front sleeve 6, such that the nut 3 doesn't rotate any longer. After the front sleeve 6 has passed solely a certain angle corresponding to the foregoing big gap provided between the laterals of the tenons 112 and the recesses 61, the circumferential recesses 61 in the inner circumference of the front sleeve 6 come into contact at their another side with the tenon 112 in the central portion of the outer circumference of the locking sleeve 11, and drives the locking plate 13 to rotate. At this time the locking cap 15 keeps on unmoving owing to being pressed, which results in the rolling members, such as the steel balls 14, to roll in an opposite direction along the eccentric grooves 131 in the end plane of the locking plate 13. Referring to FIGS. 1-3, when the locking plate 13 rotates and makes the steel balls moving from the outside position A to the inside position B in the grooves 131, the steel balls 14 changes from the state of contacting and pressing against the locking cap conical portion (corresponding to the conical portion $\lambda_A$ in the stop surface of the chuck body 1) of the undersurface of the locking cap to the state of contacting and pressing against the locking cap plane portion (corresponding to the plane portion $\lambda_B$ in the stop surface of the chuck body 1). During such process, the pressure becomes larger gradually, until the locking cap reaches the locking cap plane surface, the pressure will not increase. But the steel balls 14 will make elastic deformation dents in the locking cap 15 by pressure, so that the relative rotation between the locking assembly and the relevant parts can be prevented through the friction force between the locking cap and the stop surface of the chuck body and the position action between the locking cap dents and the steel balls, and the reliable lock is thus achieved. In the meanwhile, the three resilient tabs 151 of the locking cap 15 slide into another locking flume 132 of the locking plate 13.

During this operation, in aspect of principal, the locking assembly acts as a further locking nut for a secondary securing and locking function in addition to the locking function of screw thread between the nut 8 and jaws 4, when the working screw threads between the jaw 4 and nut 3 possess a powerful axial deformation differed from that in the prior art, which prevents the nut 3 from any tendency of rotation, thereby the reliable clamping and locking is reached.

Contrarily, in order to loosen the locking drill chuck, it is only required to rotate the front sleeve 6 in an opposite direction, and then the front sleeve 6 drives the locking sleeve 11 and further the locking plate 13 and disengages the locking flumes 132 of the locking plate 13 from the three resilient tabs 151 of the locking cap 15. At the same time, the steel balls 14 move from the inside position B to outside position A in the eccentric grooves 131, makes the steel balls 14 changing from the state of contacting and pressing against the locking cap plane portion (corresponding to the plane portion $\lambda_B$ in the stop surface of the chuck body 1) to the state of contacting and pressing against the locking cap conical portion (corresponding to the conical portion $\lambda_A$ in the stop surface of the chuck body 1) of the locking cap. During such process, the pressure becomes smaller gradually, so that the three resilient tabs 151 of the locking cap 15 slide in an reverse direction into another locking flumes 132 of the locking plate 13, thereby the axial powerful deformation of fitted screw thread of the jaws 4 and the nut 3 is released. Then the nut 3 is rotated by way of the engagements of the three resilient pawls 82 of the driving sleeve 8 and the fitted slots 62 of the front sleeve 6, and the drill tool is loosened.

In the above embodiment, the steel balls 14 press against the locking cap 15 and make dents in the locking cap 15, so that a position action between the dents and the steel balls is formed. Alternatively, the steel balls 14 press against the stop surface of the chuck body 1 directly instead of via locking cap 15, the similar effect can be achieved.

According to another embodiment of the invention, the stop surface of the chuck body 1 may be plane, and the undersurface of the locking cap 15 contacting therewith is directly formed with the conical portion and plane portion, keeping the other structures unchanged.

Figure 12:
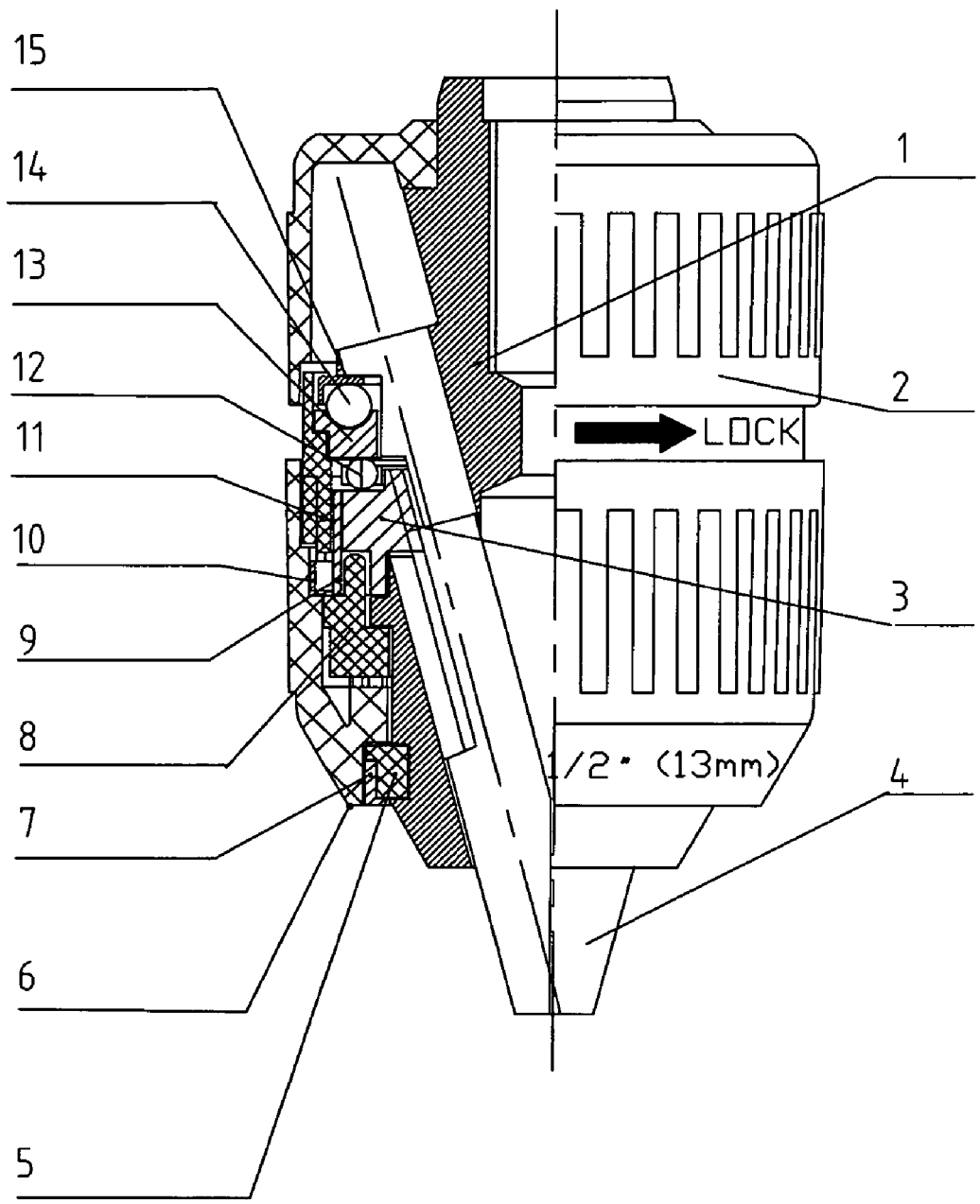
FIG. 12 is a schematic view, partly in cross-section, of a locking drill chuck in accordance with another embodiment of the present invention.
Figure 13:
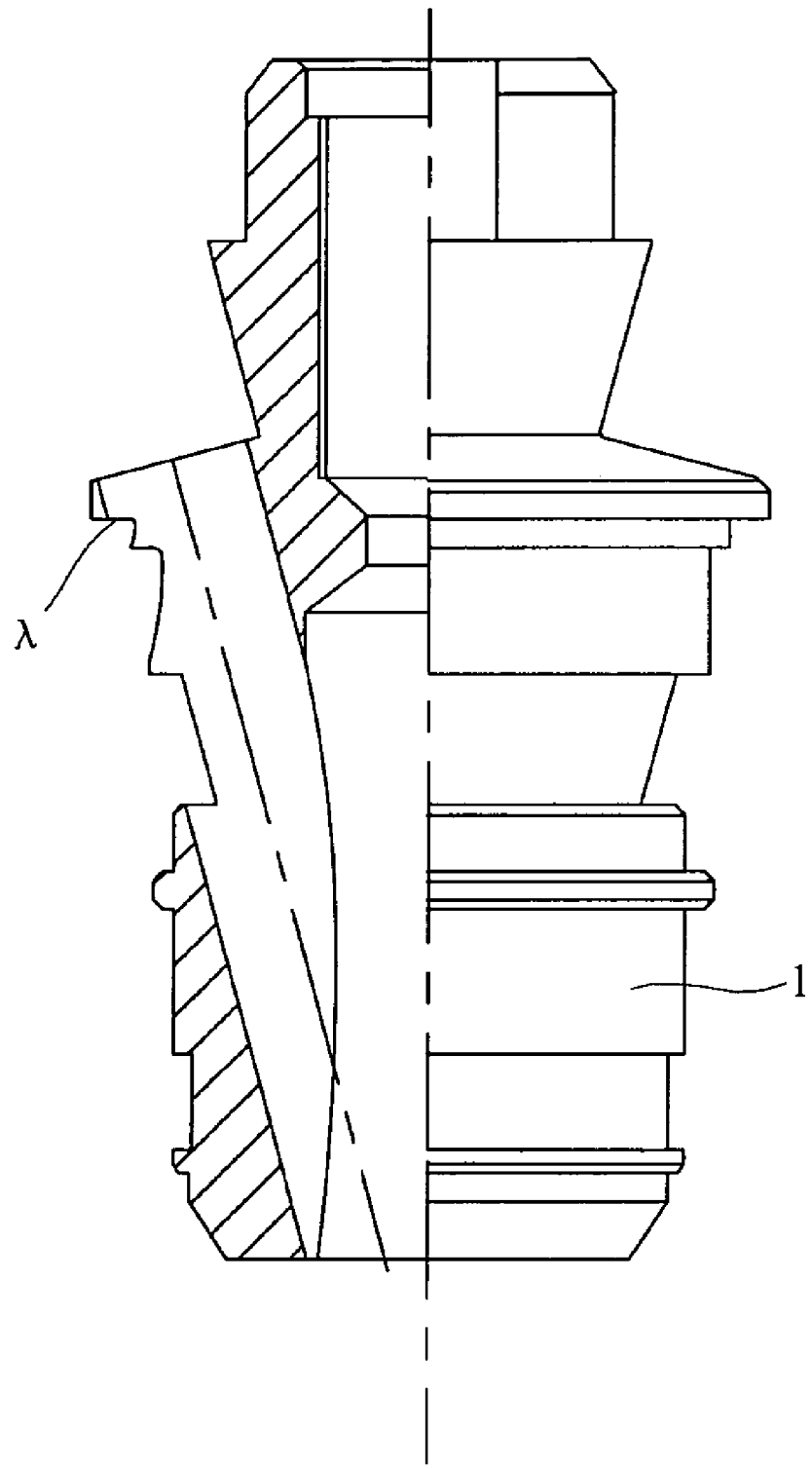
FIG. 13 is a schematic view, partly in cross-section, of the chuck body in accordance with another embodiment of the present invention.

Referring to FIG. 12 and FIG. 13, another embodiment of the locking drill chuck is shown. Wherein, different from the above embodiments, the stop surface of the chuck body 1 is plane, and the grooves in the locking plate 13 is not eccentric, but may be in-eccentric ordinary circle or arc grooves. In such case, the steel balls 14 still make dents in the locking cap 15 by pressure, so that the relative rotation between the locking assembly and the relevant parts can be prevented through the friction force between the locking cap and the stop surface of the chuck body and the position action between the locking cap dents and the steel balls, and the reliable lock is thus achieved.

While the present invention has been described and illustrated herein with reference to the preferred embodiments thereof, it will be apparent to those skilled in the art that various changes and modifications may be made therein without departing from the spirit and scope of the invention. Thus, it is intended that the present invention cover the modifications and variations of this invention that come within the scope of the appended claims and their equivalents.

The invention claimed is:

1. A locking drill chuck comprising:
   a chuck body,
   a plurality of jaws,
   a nut,
   a front sleeve, and
   a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws,
   a locking sleeve provided between the front sleeve and the rear sleeve, and connected with the front sleeve; and
   a locking assembly provided between the nut and a stop surface of the chuck body, the locking assembly includes rolling members and a locking plate, wherein the locking plate connects with the locking sleeve, and has a plurality of eccentric arc grooves in an end plane thereof facing the stop surface of the chuck body, the rolling members are received in the eccentric arc grooves, the stop surface of the chuck body includes a conical portion and a plane portion, wherein the rolling members change from contacting and pressing against the conical portion to contacting and pressing against the plane portion of the stop surface when the locking plate rotates.

2. The locking drill chuck as recited in claim 1, wherein the locking sleeve has connecting tenons on its inner circumference, and the locking plate has recesses in a lower portion of its outer circumference, the tenons and the recesses are fitted together.

3. The locking drill chuck as recited in claim 1, wherein the locking sleeve has a plurality of tenons on a central portion of its outer circumference, and the front sleeve has a plurality of recesses with a width larger than that of the tenons for receiving the tenons.

4. The locking drill chuck as recited in claim 3, further comprising a resilient interlock, which is shaped in an opening ring with a plurality of projections, the locking sleeve has a plurality of interlocking notches below the tenons, and the front sleeve has a plurality of axial interlocking slots for receiving the corresponding projections of the resilient interlock passed through the interlocking notches of the locking sleeve, so that the locking sleeve is positioned and guided in the front sleeve.

5. The locking drill chuck as recited in claim 1, further comprising a driving sleeve deposited between the front sleeve and the nut, wherein the driving sleeve has a plurality of resilient pawls around its outer circumference and a plurality of driving key at its upper end, the front sleeve has a plurality of fitted slot in its inner circumference for receiving the resilient pawls, the plurality of driving key inserted at a lower end of the nut so that the front sleeve drives the driving sleeve and thereby the nut transmits torque.

6. The locking drill chuck as recited in claim 1, the locking assembly further comprising a locking cap, wherein the locking plate has a plurality of locking flumes in the lower portion of its outer circumference, and the locking cap has a plurality of resilient tabs correspondingly, the resilient tabs may fit in and move along the locking flumes.

7. The locking drill chuck as recited in claim 1, further comprising a baffle ring rotatably mounted between the lower ends of the front sleeve and the chuck body to prevent the sleeve from axial shifting with respect to the chuck body.

8. The locking drill chuck as recited in claim 1, further comprising a baffle ring, wherein the baffle ring has an circumferential opening, and has a skirt close fitted thereto, thereby the baffle ring can fit in an annular groove formed in a lower portion of the chuck body, and resist against a rabbet at the lower end of the front sleeve.

9. The locking drill chuck as recited in claim 1, wherein the locking assembly further includes a locking cap deposited between the rolling members and the stop surface of the chuck body, the rolling members contact and press against the stop surface of the chuck body through the locking cap, and the locking cap has resilient tabs securing the locking plate together with the plurality of rolling members.

10. The locking drill chuck as recited in claim 9, wherein the groove is an arc groove.

11. The locking drill chuck as recited in claim 9, wherein the locking sleeve has connecting tenons on its inner circumference, and the locking plate has recesses in a lower portion of its outer circumference, the tenons and the recesses are fitted together.

12. The locking drill chuck as recited in claim 9, wherein the locking sleeve has a plurality of tenons on a central portion of its outer circumference, and the front sleeve has a plurality of recesses with a width larger than that of the tenons for receiving the tenons.

13. The locking drill chuck as recited in claim 12, further comprising a resilient interlock, which is shaped in an opening ring with a plurality of projections, the locking sleeve has a plurality of interlocking notches below the tenons, and the front sleeve has a plurality of axial interlocking slots for receiving the corresponding projections of the resilient interlock passed through the interlocking notches of the locking sleeve, so that the locking sleeve is positioned and guided in the front sleeve.

14. The locking drill chuck as recited in claim 9, further comprising a driving sleeve deposited between the front sleeve and the nut, wherein the driving sleeve has a plurality of resilient pawls around its outer circumference and a plurality of driving key at its upper end, the front sleeve has a plurality of fitted slot in its inner circumference for receiving the resilient pawls, the plurality of driving key inserted at a lower end of the nut so that the front sleeve drives the driving sleeve and thereby the nut transmits torque.

15. The locking drill chuck as recited in claim 9, wherein the locking plate has a plurality of locking flumes in the lower portion of its outer circumference, and the locking cap has a plurality of resilient tabs correspondingly, the resilient tabs may fit in and move along the locking flumes.

16. The locking drill chuck as recited in claim 9, further comprising a baffle ring rotatably mounted between the lower ends of the front sleeve and the chuck body to prevent the sleeve from axial shifting with respect to the chuck body.

17. The locking drill chuck as recited in claim 9, further comprising a baffle ring, wherein the baffle ring has an circumferential opening, and has a skirt close fitted thereto, thereby the baffle ring can fit in an annular groove formed in a lower portion of the chuck body, and resist against a rabbet at the lower end of the front sleeve.

18. A locking drill chuck comprising:
a chuck body,
a plurality of jaws,
a nut, a front sleeve,
and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws,
a locking sleeve provided between the front sleeve and the rear sleeve, and connected with the front sleeve; and
a locking assembly provided between the nut and a stop surface of the chuck body, the locking assembly includes:
a locking plate, connecting with the locking sleeve and having a plurality of eccentric arc grooves in an end plane thereof facing the stop surface of the chuck body;
rolling members received in the eccentric arc grooves; and
a locking cap deposited between the rolling members and the stop surface of the chuck body, including a conical portion and a plane portion at the undersurface thereof, and having resilient tabs securing the locking plate together with the plurality of rolling members, wherein the rolling members chance from contacting and pressing against the conical portion to contacting and pressing against the plane portion of the stop surface when the locking plate rotates.

19. A locking drill chuck comprising
a chuck body,
a plurality of jaws,
a nut,
a front sleeve, and
a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws,
a locking sleeve provided between the front sleeve and the rear sleeve, and connected with the front sleeve; and a locking assembly provided between the nut and a stop surface of the chuck body, the locking assembly includes:

a locking plate, connecting with the locking sleeve and having a plurality of eccentric arc grooves in an end plane thereof facing the stop surface of the chuck body;

rolling members received in the eccentric arc grooves; and a locking cap deposited between the rolling members and the stop surface of the chuck body, and having resilient tabs securing the locking plate together with the plurality of rolling members, wherein the rolling members change from contacting and pressing against a conical portion of the stop surface to contacting and pressing against a plane portion of the stop surface when the locking plate rotates.

* * * * *

UNITED STATES PATENT AND TRADEMARK OFFICE
CERTIFICATE OF CORRECTION

PATENT NO. : 7,654,539 B2
APPLICATION NO. : 11/360152
DATED : February 2, 2010
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this

Twenty-third Day of November, 2010

David J. Kappos
*Director of the United States Patent and Trademark Office*